US008560955B2

(12) United States Patent  
Jana et al.

(10) Patent No.: US 8,560,955 B2
(45) Date of Patent: Oct. 15, 2013

(54) SYSTEM AND METHOD FOR BRIDGING COMMUNICATION SERVICES BETWEEN VIRTUAL WORLDS AND THE REAL WORLD

(75) Inventors: Rittwik Jana, Parsippany, NJ (US); Andrea Basso, Marlboro, NJ (US); Giuseppe di Fabbrizio, Florham Park, NJ (US); David C. Gibbon, Lincroft, NJ (US); Bernard S. Renger, New Providence, NJ (US); Bin Wei, Basking Ridge, NJ (US); Yih-Farn Chen, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 748 days.

(21) Appl. No.: 12/274,925

(22) Filed: Nov. 20, 2008

(65) Prior Publication Data
US 2010/0125800 A1 May 20, 2010

(51) Int. Cl.
G06F 3/048 (2013.01)

(52) U.S. Cl.
USPC ............................ 715/757; 715/848; 715/850

(58) Field of Classification Search
USPC ......................................... 715/757, 848, 850
See application file for complete search history.

(56) References Cited

U.S. PATENT DOCUMENTS

| 7,115,034 | B2 | 10/2006 | Kuwahara |
| 7,675,519 | B2 * | 3/2010 | Tobias ........................ 345/473 |
| 8,151,191 | B2 * | 4/2012 | Nicol, II ....................... 715/706 |
| 8,307,047 | B2 * | 11/2012 | Almeida ....................... 709/217 |
| 8,323,068 | B2 * | 12/2012 | Ganetakos et al. ............ 446/175 |
| 8,386,414 | B2 * | 2/2013 | Bromenshenkel et al. ..... 706/54 |
| 8,402,378 | B2 * | 3/2013 | Blattner et al. ................ 715/758 |
| 8,453,061 | B2 * | 5/2013 | Bromenshenkel et al. ... 715/757 |
| 8,460,052 | B2 * | 6/2013 | Ganz ............................ 446/175 |
| 2002/0113809 | A1 * | 8/2002 | Akazawa et al. ............. 345/706 |
| 2002/0154174 | A1 * | 10/2002 | Redlich et al. ................ 345/848 |
| 2008/0021963 | A1 | 1/2008 | Jana et al. |
| 2008/0021976 | A1 | 1/2008 | Chen et al. |
| 2008/0034056 | A1 | 2/2008 | Renger et al. |
| 2008/0255957 | A1 * | 10/2008 | Erdem et al. .................... 705/26 |
| 2008/0262910 | A1 * | 10/2008 | Altberg et al. .................. 705/14 |
| 2009/0125481 | A1 * | 5/2009 | Mendes da Costa et al. ..... 707/3 |
| 2009/0138355 | A1 * | 5/2009 | Jung et al. ....................... 705/14 |
| 2009/0199275 | A1 * | 8/2009 | Brock et al. .................... 726/4 |
| 2009/0249227 | A1 * | 10/2009 | Clark et al. .................... 715/757 |
| 2009/0287682 | A1 * | 11/2009 | Fujioka et al. .................... 707/5 |
| 2009/0299988 | A1 * | 12/2009 | Hamilton et al. ................. 707/5 |
| 2010/0050237 | A1 * | 2/2010 | Bokor et al. ...................... 726/4 |
| 2010/0070883 | A1 * | 3/2010 | Hamilton et al. ............. 715/757 |
| 2010/0083157 | A1 * | 4/2010 | Follmann et al. ............. 715/771 |
| 2012/0258797 | A1 * | 10/2012 | Cullen et al. .................... 463/35 |

* cited by examiner

*Primary Examiner* — David Phantana Angkool
(74) *Attorney, Agent, or Firm* — Akerman Senterfitt; Michael K. Dixon; Roy Zachariah (57) ABSTRACT

A system includes a gateway operative to couple the system to a user. The system further includes a first infolet coupled to the gateway, and operative to couple the system to a first virtual world application, a second infolet coupled to the gateway and to the first infolet, and operative to couple the system to a real world application. The system is operable to obtain first information requested by the user from the second infolet and send the first information to the virtual world application through the first infolet.

20 Claims, 8 Drawing Sheets

SYSTEM AND METHOD FOR BRIDGING COMMUNICATION SERVICES BETWEEN VIRTUAL WORLDS AND THE REAL WORLD

FIELD OF THE DISCLOSURE

The present disclosure generally relates to communication systems, and more particularly relates to systems and methods for bridging between networked virtual environments and real world environments.

BACKGROUND

A networked virtual world is a software-generated environment that allows network-connected users to share real-time interactions with each other. Networked virtual environments are used for collaborative design and engineering, massively multi-player on-line role-playing games, distance learning, and three-dimensional simulations such as "Second Life." In Second Life, for example, people can use computers to create virtual figures called avatars that live in a virtual environment.

In a virtual world, residents can socialize, or conduct business using a virtual currency. Activities in the virtual world can affect the real world, and vice versa. For example, currency exchanges exist to trade virtual currency for actual currency. Also, real world performers can invite residents to virtual performances, charging an admission fee in the virtual currency.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
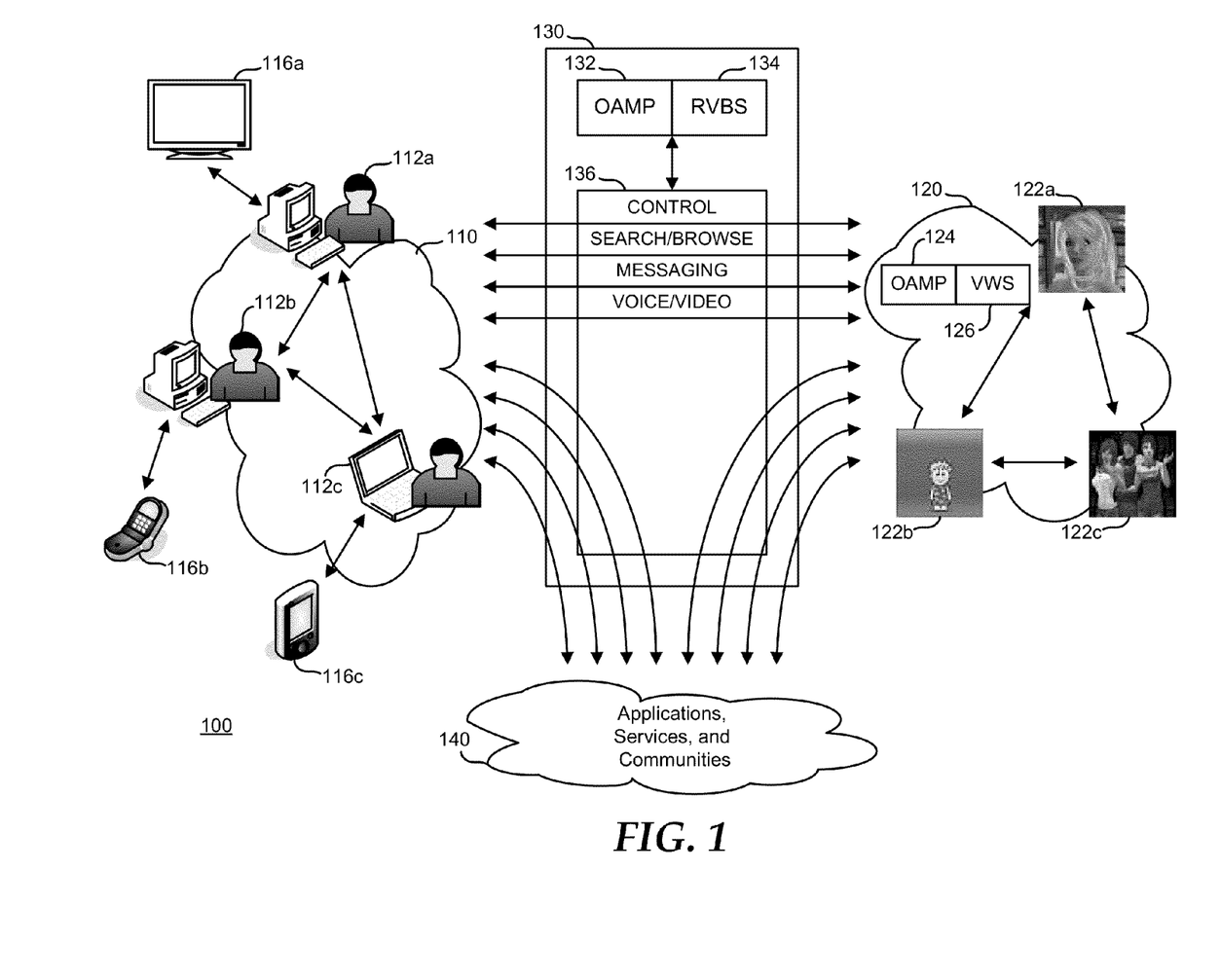
FIG. 1 is an illustration showing an embodiment of a communication network with a real world and a virtual world bridged by a real-world/virtual-world bridging service entity.

FIG. 1 shows a communication network 100 including a real world network (RW) 110, one or more virtual worlds (VW) 120, a real-world/virtual-world bridging service entity (SE) 130 and a set of applications, services, and communities (AS&C) 140. RW 110 includes users 112 (shown as individual users 112a, 112b, and 112c). In RW 110, users 112 are networked together such that they share various forms of communication with each other. As such, it will be appreciated that users 112a, 112b, and 112c each have an associated means of connecting to a network. Such means may include a personal computer, a laptop computer, another computing device, or a combination thereof. Users 112 also have accounts with various services and communities and use various applications in AS&C 140. Users 112 can have one or more associated network-connected devices 116. In an embodiment, user 112a is associated with a television set-top box 116a, user 112b is associated with a battery-operated mobile communication device 116b, and user 112c is associated with a personal data assistant 116c. Users 112 can communicate directly with each other, with VW 120, and with AS&C 140 through RW 110, or users 112 can communicate with each other, with VW 120, and with AS&C 140 through their associated network-connected devices 116. In an illustrative embodiment, RW 110 and AS&C 140 include the Internet, a local area network, another communication network, or any combination thereof. A non-limiting example of users 112 includes an individual person, a group of persons, a business entity, another entity or group of entities, or any combination thereof. Television set-top box 116a, mobile communication device 116b, and personal data assistant 116c are non-limiting examples of network-connected devices 116.

VW 120 includes avatars 122, shown as individual avatars 122a, 122b, and 122c, an operations, administration, maintenance, and provisioning server (OAMP) 124, and a virtual world server (VWS) 126. OAMP 124 monitors VW 120, collects accounting and usage data, manages system resources and sets up and manages user accounts in VW 120. VWS 126 includes software that creates VW 120 and avatars 122, and that manages the interactions between avatars 122 and the environment of VW 120. VWS 126 can create a three-dimensional (3D) environment in which users 112 manipulate their avatars 122. Each avatar 122 is associated with a particular user 112. For example, user 112a is associated with avatar 122a in VW 120, user 112b is associated with avatar 122b, and user 112c is associated with avatar 122c. When a particular user 112a wishes to interact in VW 120, user 112a instructs avatar 122a to enter VW 120 and then manipulates avatar 122a to interact with other avatars 122b and 122c, and with the environment of VW 120. While users 112 and avatars 122 are shown in direct association, note that a particular user can also be associated with more than one avatar in a particular virtual world, or can be associated with more than one virtual world. Moreover, one or more users can be associated with a virtual object in the virtual world, as when several users control a particular piece of land or a building in the virtual world.

SE 130 includes an OAMP 132, a real-world/virtual-world bridging server (RVBS) 134, and a bridge/interface 136. SE 130 provides bridging services between RW 110, VW 120 and AS&C 140. As such, SE 130 provides interfaces to users 112 and their associated network connected devices 116, to VW 120, and to AS&C 140. The interfaces can use standard and proprietary protocols to share content, control or other data between users 112, their associated network connected devices 116, VW 120, and AS&C 140. OAMP 132 monitors SE 130, collects accounting and usage data, manages system resources and sets up and manages user accounts in SE 130. RVBS 134 creates accounts and manages interactions between users 112, their associated network connected devices 116, VW 120, and AS&C 140.

Bridge/interface 136 controls the interactions of and bridges between users 112, their associated avatars 122, and their associated accounts and applications in AS&C 140. As such, bridge/interface 136 permits users 112 to access their associate accounts and applications in AS&C 140, bridging between RW 110 and AS&C 140. Likewise, bridge/interface 136 permits users 112 to control the activities of their associated avatars 122 and receive feedback from VW 120, for example in the form of 3D images of new places that avatars 122 visit. Bridge/interface 136 also enables users 112 to search or browse VW 120 or AS&C 140. Thus, user 112b can instruct avatar 122b to search VW 120 to find out if another avatar 122c is currently in VW 120, or to browse for interesting activities occurring in VW 120. Further, bridge/interface 136 provides messaging and voice/video content between users 112 and avatars 122. For example, a text or chat message initiated by user 112a can be sent from avatar 122a to avatar 122c, and the text or chat message will be forwarded to user 112c. In this way, interactions in VW 120 are bridged to RW 110.

In another example, if user 112c is a band of performers, user 112c can create a performance space in VW 120 and invite their fans, as represented by avatars 122a and 122b, to attend the performance in VW 120. Users 112a and 112b can instruct their avatars 122a and 122b to attend the performance in VW 120. If user 112b cannot instruct avatar 122b to attend the virtual performance in VW 120, SE 130 can stream the performance to mobile communication device 116b, or SE 130 can store the performance for later viewing by user 112b.

When the performance in VW 120 is sent to users 112 in a particular format or protocol, but users' network-connected devices 116 only accept content in a different format or protocol, SE 130 transforms the performance from the particular format or protocol into the different format or protocol used by user's network-connected devices 116. In this way, SE 130 can bridge between RW 110, VW 120 and AS&C 140 in a way that accounts for different format and protocol requirements of users 112, network-connected devices 116, VW 120, and AS&C 140. For example, if mobile communication device 116b is situated behind a low bandwidth link, such as a 2G cellular link, SE 130 can stream just the audio content of the performance to mobile communication device 116b.

SE 130 includes many features of existing telecommunications services. SE 130 also includes additional services and features that enable enhanced bridging between RW 110, VW 120 and AS&C 140. SE 130 maintains presence and identity information of users 112 and avatars 122, enabling fast, seamless communication between users 112 and avatars 122. Also, SE 130 enables unified billing and tracking of communication services between RW 110 and VW 120. For example, where various communication services in a particular virtual world can be billed in a virtual currency, SE 130 can provide a bridge account that tracks virtual currency billing and maps it into an account that bills the real world user in the local currency. Further, SE 130 enables estate management in VW 120, where, for example, user 112a is able to create new services in VW 120 that can continue in existence after user 112a has ceased to exist in VW 120, and rights in VW 120 can be transferred to another user 112b. Also, SE 130 enables wider bridging between network-connected devices 116 and VW 120.

In another embodiment, users 112 and network-connected devices 116 can include personal bridge/interfaces (not shown). Where users 112 include a personal bridge/interface, the personal bridge/interface permits reduced data traffic in VW 120, in that compute intensive activities can be handled by users 112. For example, 3D rendering can be performed on a user's personal computer. Such personal bridge/interfaces can also perform context mapping of RW 110 events. For example, a personal bridge/interface in network-connected devices 116 can extract a location from a GPS module in network-connected devices 116, and can send the context information to bridge/interfaces 136 in SE 130.

Figure 2:
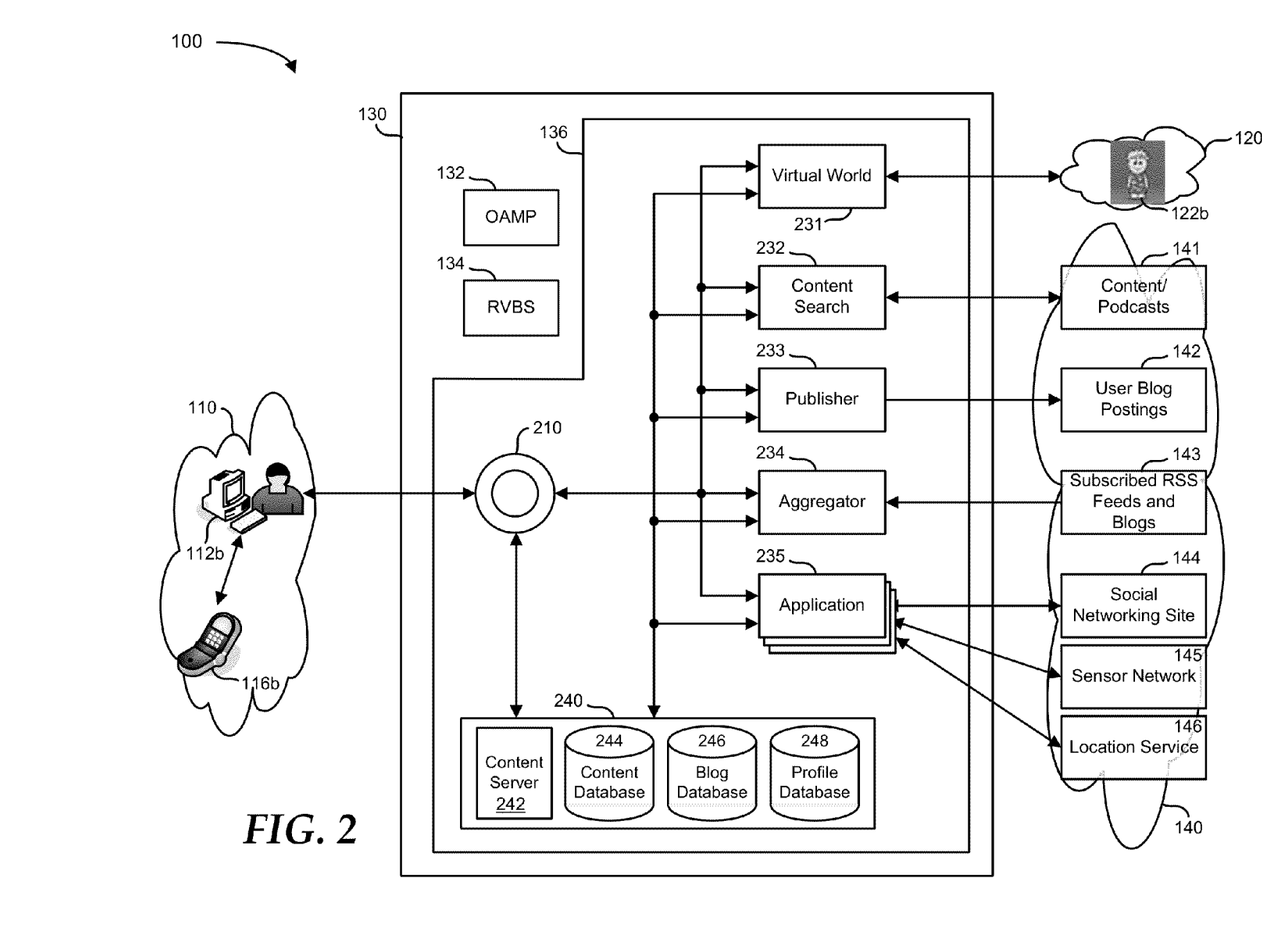
FIG. 2 is a block diagram showing an embodiment of the real-world/virtual-world bridging service entity of FIG. 1.

FIG. 2 shows an embodiment of SE 130 bridging between RW 100, VW 200, and AS&C 140. SE 130 includes an OAMP 132, an RVBS 134, and bridge/interface 136. Bridge/interface 136 includes a gateway 210, one or more infolets 231 through 235, and a database server 240. Note that SE 130 may be implemented on a single computing device incorporating the features described below, or on multiple computing devices incorporating the features of OAMP 132, RVBS 134, and bridge/interface 136 including gateway 210, infolets 231 through 235, and database server 340, separately or as any combination thereof.

Gateway 210 is coupled to RW 110, such that users 112 (as illustrated by user 112b) can send data to, and receive data from bridge/interface 136. Gateway 210 provides an interface point that receives information in different interface standards. As a non-limiting example, gateway 210 can receive hypertext transfer protocol (HTTP) data, e-mail data, multimedia messaging service (MMS) data, voice data, session initiation protocol (SIP) data including instant messaging support such as Mobile Instant Messaging (MIM) data, or Extensible Messaging and Presence Protocol (XMPP) data, file transfer protocol (FTP) data, any other open or proprietary standard data, or any combination thereof. Gateway 210 sends and receives data from infolets 231 through 235.

Infolets 231 through 235 are software modules that implement application specific logic and provide access to standard or application specific data for use by various applications, services, or communities in AS&C 140, or by VW 120. As such, infolets 231 through 235 receive information from users 112 and format the information into a form suitable to the particular application, service, or community in VW 120 or AS&C 140. Upon receiving information from VW 120 or the particular application, service, or community in AS&C 140, infolets 231 through 235 format the information into a form suitable for forwarding to users 112 through gateway 210. As a non-limiting example, virtual world infolet 231 implements application specific logic and provides access to VW 120, content search infolet 232 implements content management engine logic and provides access to a content search service 141, publisher infolet 233 implements publishing logic and provides access to a blog service 142, aggregator infolet 234 implements aggregator logic to receive data from rich site summary (RSS) and blog feeds 143, and additional application infolets 235 implement application specific logic and provide access to other services and communities such as a social networking site 144, a sensor network 145, and a location service 146. Bridge/interface 136 can include an infolet for another application, service, or community, not shown, such as a content delivery application, an e-commerce service, a gaming community, another service or community related application, or any combination thereof.

Database server 240 includes a content server 242, a content database 244, a blog database 246, and a profile database 248. Database server 240 is coupled to gateway 210 and to bridge/interface 136. Content server 242 stores content received from users 112 by gateway 210. Content database 244 provides a pointer to content stored on content server 242. Such a pointer can include a universal resource locator (URL), an FTTP address, or another pointer to permit access to the content to services and communities in AS&C 140. Blog database 246 includes blog posts from users 122 for blogs hosted by SE 130. Profile database 248 includes users' 112 profiles, where a particular user, such as user 112b, is associated with blog postings 142, social networking sites 144, etc.

In operation, SE 130 functions to receive data from users 112 or their associated network-connected devices 116, and send the data to VW 120 or to the various applications, services, or communities in AS&C 140. The data may conform to the different interface standards associated with gateway 310, in which case the data is forwarded to a targeted infolet 231, 232, 233, 234, or 235 where the data is converted by the targeted infolet 231, 232, 233, 234, or 235 into commands or data in a format appropriate to the target. If the data does not conform to one of the interface standards associated with gateway 310, or the data is recognized as including certain specifically formatted content types, the data is stored on content server 242, a locator for the data is created on content database 244, and the locator is forwarded by the targeted infolet 231, 232, 233, 234, or 235. Content stored on storage server 242 may include media files of various formats, such as video, picture, and sound file formats, document files or other data that users 112 desire to store on content server 242. Content database 244 can provide locator data in a web-based format, such as a URL or FTP locator.

SE 130 also operates to receive data from VW 120 and from the various applications, services, or communities in AS&C 140, and send the data to users 112. Infolets 231 through 235 convert the data to an interface standard associated with gateway 210 suitable to communicate the data to users 112 or their associated network-connected devices 116. In addition, SE 130 operates to convert data received from the various applications, services, or communities in AS&C 140 into a format that is automatically aggregated, queried, and filtered by aggregator infolet 234 based upon users' 112 preferences, which are stored in a user profile in profile database 248. The filtered data is converted to an interface standard associated with gateway 210 suitable to communicate the filtered data to users 112 or their associated network-connected devices 116. For example, aggregator infolet 234 can receive data from RSS and blog feeds 143 and combine the data with data from blog database 246. Aggregator infolet 234 can then query and filter the data based upon an established user profile in profile database 248 and send an e-mail through gateway 210 to user's 112b mobile communication device 116b. Aggregator infolet 234 can also publish a blog posting through publisher 233 on a blog service 142.

User profiles in profile database 248 can be created or modified by users 112. For example, user 112b can have a user profile in profile database 248 that includes a list of blogs and RSS feeds to which user 112b subscribes, and aggregator infolet 234 can send only those blogs and RSS feeds to user 112b. User profiles in profile database 248 can also be created by synthesizing data received from application infolets 235. For example, user 112b can have an account with a social networking site 144, and have a locator service 146 through a global positioning system (GPS) enabled mobile communication device 116b. Access information to the social networking site 144 and the locator service 146 can be stored in user's 112b profile. In an embodiment, aggregator infolet 234 can access application infolets 235 to determine user's 112b interests and location, and send information to user's 112b mobile communication device 116 that informs user 112b of places of possible interest that are in the proximity of user's 112b current location.

In another regard, SE 130 operates to search media content and podcasts through content search infolet 232. Content search infolet 232 uses a content management engine that allows users 112 to create their own RSS feeds tailored to their personal preferences by specifying query terms using intuitive query syntax. The queries can be as simple as a single word or phrase, or may include additional content metadata restrictions such as a specific date range or a set of television programs to search. In addition, content search infolet 232 maintains a list of RSS feeds, content sites, and podcast URLs, associated content owner information, and a program naming schema for recurring scheduled broadcast content. On a scheduled basis, the feeds, sites, and URLs are checked for new content. If new content is found, the new content is downloaded, processed, and entered into a media archive.

Content search infolet 232 searches the media archive using textual information retrieval methods to search content metadata, extending text based search capabilities to media content. Also, content search infolet 232 searches the media archive using content- and shape-based retrieval methods, where two-dimensional projections or 3D objects are provided, and content containing similar projections or objects are retrieved. Such content- and shape-based retrieval can be processed on rendered images, or on the data upon which the rendered content is based. In this way, content search infolet 232 provides users 112 with search results for content that is similar to text based search results.

Further, SE 130 operates to receive data from VW 120, and send it to users 112. Virtual world infolet 231 operates similarly to bridge/interface 136, controlling the interactions between users 112 in RW 110 and their associated avatars 122 in VW 120. Virtual world infolet 231 also converts data from VW 120 to an interface standard associated with gateway 310 suitable to communicate the data to users 112 or their associated network-connected devices 116. SE 130 also operates to convert data received from VW 120 into a format that is automatically aggregated, queried, and filtered by virtual world infolet 231 based upon users' 112 preferences. The filtered data is communicated to users 112 or to their associated network-connected devices 116. For example, virtual world infolet 231 can receive data from VW 120. Then, based upon an established user profile, virtual world infolet 231 can query and filter the data and then notify user 112b of events or locations within VW 120 that are of interest to user 112b. Different virtual world infolets can be implemented that use standard or proprietary protocols to interface with different virtual world instantiations. For example, an interface with Second Life may be established by standard protocols such as chat, e-mail, HTTP, extensible markup language remote procedure call (XML-RPC), and instant messaging, while other virtual worlds may be interfaced through proprietary interfaces.

Inclusion of virtual world infolet 231 in SE 130 also enables greater bridging capabilities between RW 110 and VW 120. Users 112 obtain information from AS&C 140 based upon the activities and preferences of avatars 122 in VW 120, and information from VW 120 based upon activities and preferences in RW 110. In enhancing users RW 110 experience with VW 120 content, consider user 112*b*, with social networking site 144 and locator service 146 accounts. Having accessed application infolets 235 to determine user's 112*b* interests, virtual world infolet 231 sends information to user's 112*b* mobile communication device 116, informing user 112*b* of scheduled events in VW that might be of interest to user 112*b*. For example, someone with a preference for poetry may receive an e-mail or text message containing information about a scheduled poetry reading in VW 120 that evening. On the other hand, VW 120 activities are enhanced with information and content from RW 110. Consider avatar 122*b* has entered a virtual automobile show in VW 120 and browsed information on a particular vehicle. When user 112*b* is located near an automobile dealership that is displaying that particular vehicle, user 112*b* may receive a text message on their mobile communication device 116*b* with the location information.

Consider the above example where user 112*c* is a band of performers. User 112*c* can create a performance space and schedule a performance in VW 120. SE 130 will access application applets 235 to determine user's 112*c* fans, send information inviting users 112*a* and 112*b* to the performance in VW 120, and post the information to user's 112*c* blog post via publisher infolet 233. SE 130 also accesses aggregator 234 to determine if there are any related RSS feeds or blog posts, such as reviews, and sends updates with the information to users 112*a* and 112*b*, and to user's 112*c* blog. Avatars 122*a* and 122*b* can attend the performance with user 112*b* viewing the performance on mobile communication device 116*b* and user 112*a* viewing the performance on set-top box 116*a*. If user 112*a* has a nightclub and is playing the performance at the nightclub, user 112*a* may post a blog announcing that fact. Then, if user 112*b* is located near the nightclub, SE 130 sends a text message or e-mail to user's 112*b* mobile communication device 116*b*, with an invitation to the night club to view the performance.

VW 120 typically includes the ability to create synthetic content from avatars' 122 activities in VW 120. For example, user 112*c* can record a particular movement of avatar 122*c* to a favorite location within VW 120, dub narration of the movement onto the recording, and send the recording to user's 112*c* blog posting 142. The synthetic content from VW 120 is also searched by content search infolet 232, providing users 112 with the ability to search for content and locations in VW 120.

Figure 3:
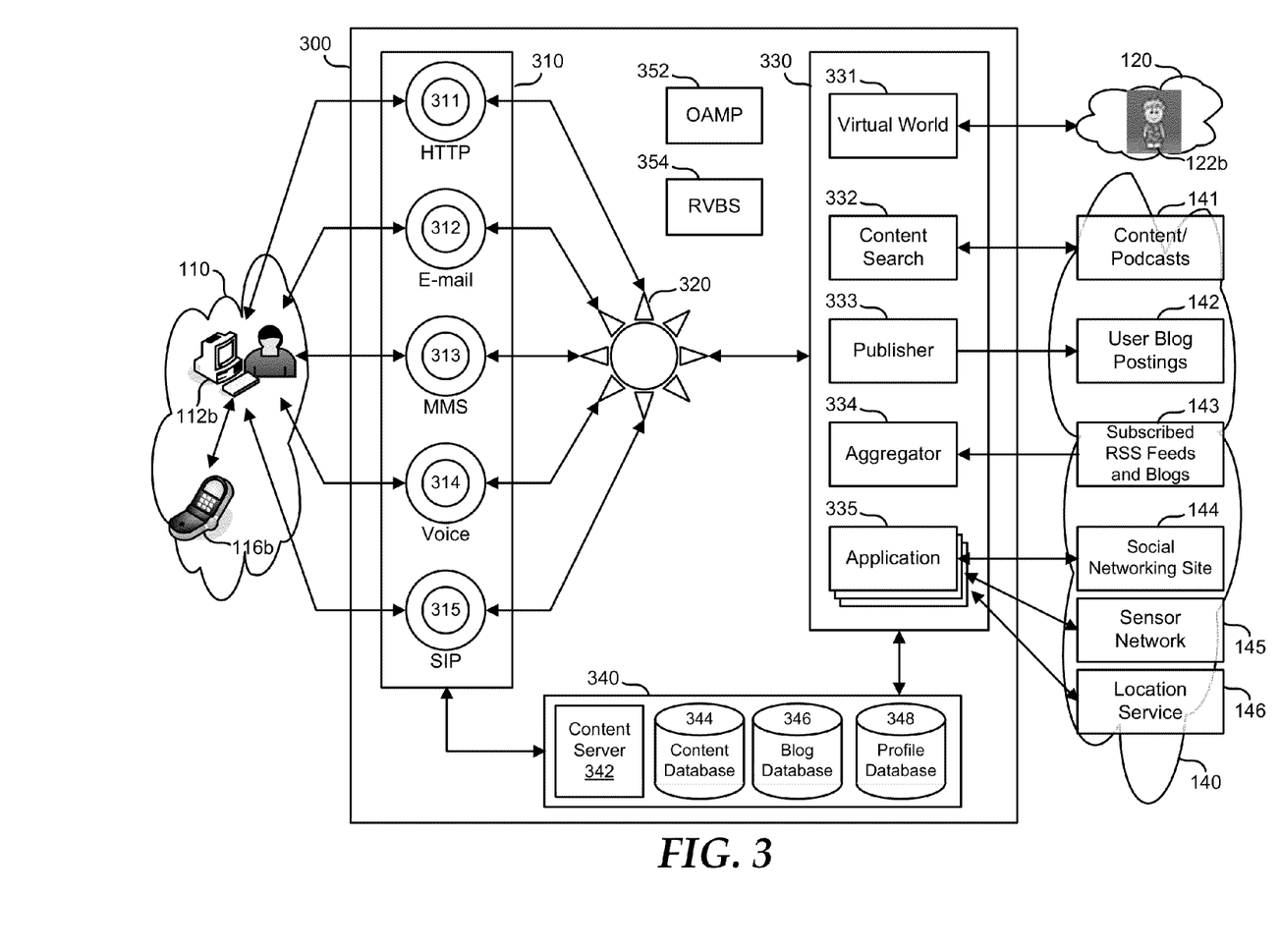
FIG. 3 is a block diagram showing an embodiment of a multimedia content conversion, aggregation, and dissemination platform.

FIG. 3 shows an embodiment of a multimedia content conversion, aggregation, and dissemination platform (M×M) 300 bridging between RW 100, VW 200, and AS&C 140. M×M 300 is similar to the multimedia content conversion, aggregation, and dissemination platform described in U.S. Patent Application Publication No. 2008/0034056, the disclosure of which is hereby incorporated by reference. M×M 300 includes a gateway server 310, a message switch 320, a bridge/interface server (BIS) 330, a database server 340, an OAMP 152, and an RVBS 154. Note that M×M 300 may be implemented on a single computing device incorporating the features described below, or on multiple computing devices incorporating the features of gateway server 310, message switch 320, BIS 330, database server 340, OAMP 152, and RVBS 154, separately or as any combination thereof.

Gateway server 310 includes several protocol gateways 311, 312, 313, 314, and 315. Protocol gateways 311 through 315 are coupled to RW 110, such that users 112 (as illustrated by user 112*b*) can send data to, and receive data from M×M 300. Protocol gateways 311 through 315 each provide a different interface point that corresponds to a different interface standard. As a non-limiting example, protocol gateway 311 provides a hypertext transfer protocol (HTTP) interface, protocol gateway 312 provides an e-mail interface, protocol gateway 313 provides a multimedia messaging service (MMS) interface, protocol gateway 314 provides a voice interface, and protocol gateway 315 provides a session initiation protocol (SIP) interface including instant messaging support such as Mobile Instant Messaging (MIM), or Extensible Messaging and Presence Protocol (XMPP). Gateway server 310 can include other protocol gateways, not shown, such as a file transfer protocol (FTP) gateway, or any other open or proprietary interface standard protocol gateway.

Message switch 320 receives data from protocol gateways 311 through 315 and switches the data to BIS 330, and receives data from BIS 330 and switches it to the appropriate protocol gateway 311, 312, 313, 314, or 315, based upon the open interface standard of the data received from BIS 330. Message switch 320 can also handle load balancing between gateway server 310 and BIS 330.

BIS 330 includes several infolets 331, 332, 333, 334, and 335. Infolets 331 through 335 function similarly to infolets 231 through 235 to implement application specific logic and provide access to standard or application specific data for use by various applications, services, or communities in AS&C 140, or by VW 120, as described above. Likewise, database server 340 functions similarly to database server 240, OAMP 352 functions similarly to OAMP 132, and RVBS 354 functions similarly to RVBS 134, as described above.

In operation, M×M 300 functions to receive data from users 112 or their associated network-connected devices 116, and send it to the various applications, services, or communities in AS&C 140, or in VW 120. The data may conform to the different interface standards associated with protocol gateways 311 through 315, in which case the data is switched to BIS 330 where the data is converted by a targeted infolet 331, 332, 333, 334, or 335 into commands or data in a format appropriate to the target. If the data does not conform to one of the interface standards associated with protocol gateways 311 through 315, or the data is recognized as including certain specifically formatted content types, the data is stored on content server 342, a locator for the data is created on content database 344, and the locator is forwarded by the targeted infolet 331, 332, 333, 334, or 335. Content stored on storage server 342 may include media files of various formats, such as video, picture, and sound file formats, document files or other data that users 112 desire to store on content server 342. Content database 344 can provide locator data in a web-based format, such as a URL or FTP locator. In other respects, M×M 300 functions similarly to bridge/interface 136, as described above.

Figure 4:
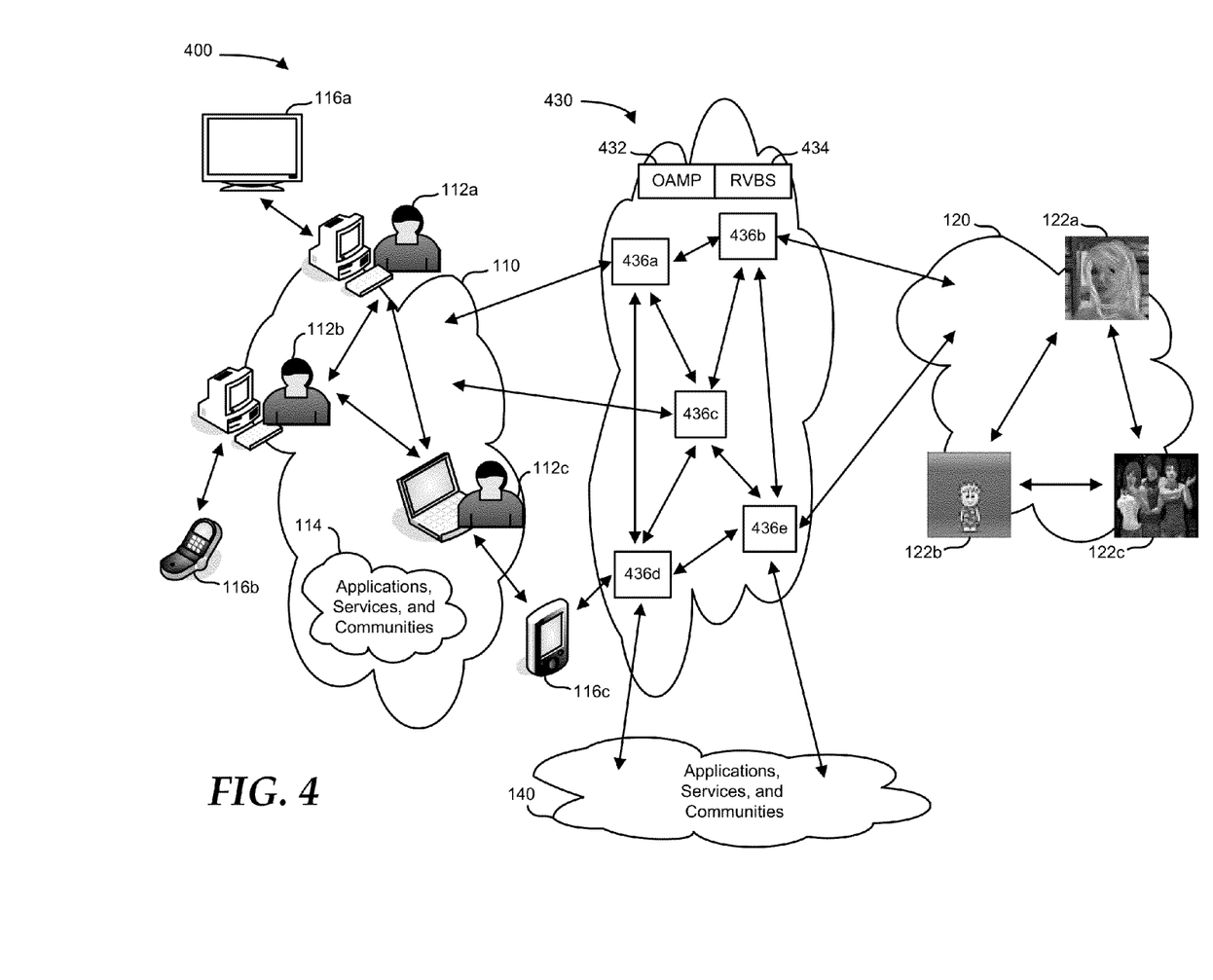
FIG. 4 is an illustration showing an embodiment of the communication network of FIG. 1 with a real world and a virtual world bridged by a scalable real-world/virtual-world bridging service network.

FIG. 4 shows an embodiment of communication network 400 wherein RW 110 and VW 120 are bridged by a scalable real-world/virtual-world bridging service network (SSN) 430. SSN 430 includes an OMNP 432, an RVBS 434, and multiple bridge/interfaces 436. SSN 430 functions similarly to SE 130. However, SSN 430 is instituted such that the interconnectivity between RW 110, VW 120 and AS&C 140 is not reliant on a single bridge/interface 136, but upon multiple bridge/interfaces 436. As such, each element of communication network 400 includes two or more access paths. As such, RW 110 has direct access to SSN 430 through bridge/interfaces 436*a* and 436*c*, and has indirect access to SSN 430 through bridge/interface 436*d*, which provides access to network-connected devices as shown by a connection to personal data assistant 116*c*. VW 120 has access to SSN 430 through bridge/interfaces 436*b* and 436*e*. AS&C 140 has access to SSN 430 through bridge/interfaces 436*d* and 436*e*.

Similarly, each bridge/interface 436a through 436e shares a connection with two or more other bridge/interfaces 436a through 436e.

Figure 5:
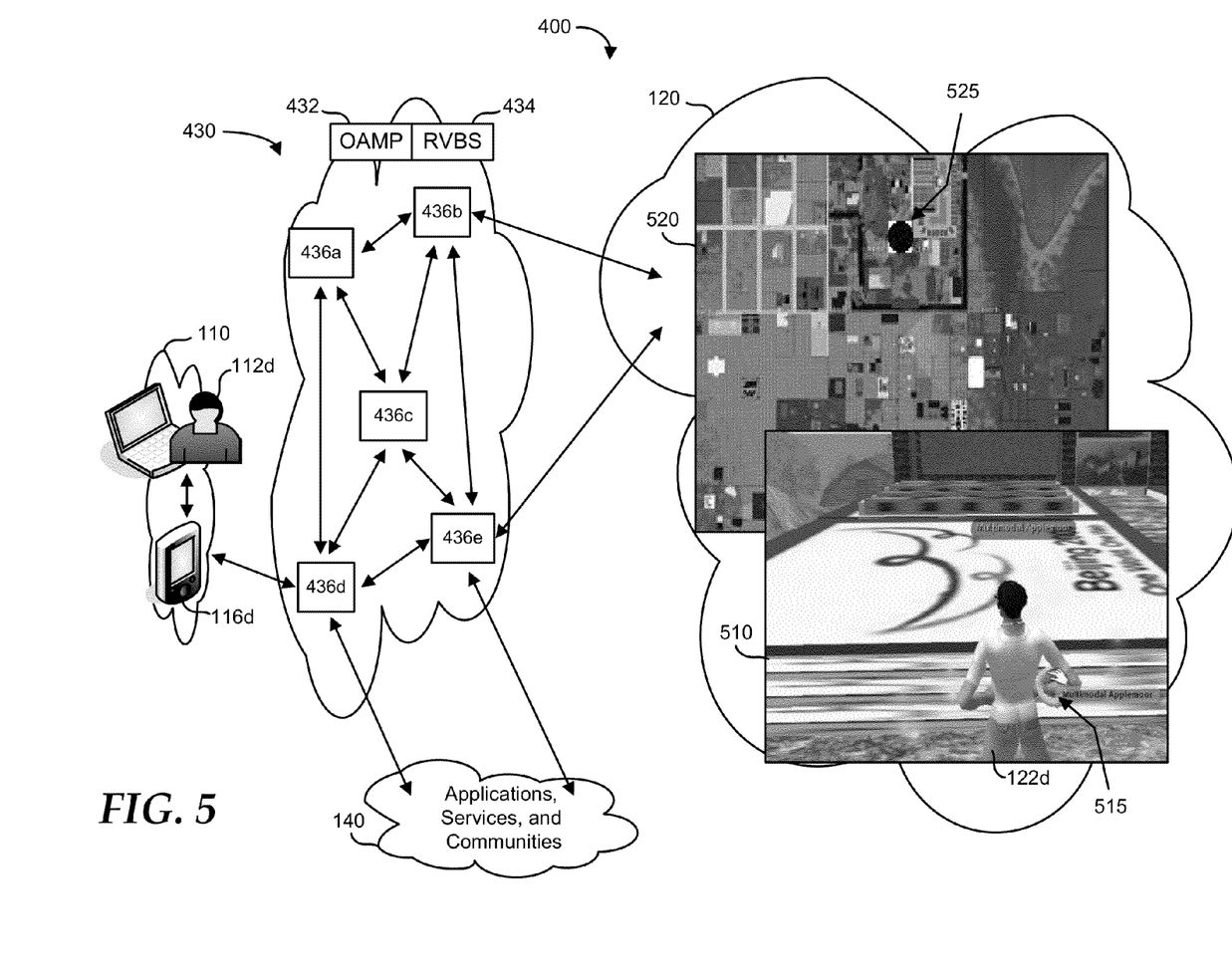
FIG. 5 is an illustration showing an embodiment of the communication network of FIG. 1, where an avatar in the virtual world is shown carrying a virtual position sensor.

FIG. 5 shows an embodiment of communication network 400 including RW 110, VW 120, and SSN 430. RW 100 includes user 112d, and user's 112d connected device 116d. VW 120 illustrates a screen capture 510 and a grid 520. Screen capture 510 includes avatar 122d that is associated with user 112d. Avatar 112d is shown carrying a virtual position sensor (VPS) 515. VPS 515 provides a grid locator 525 for avatar 122d within grid 520. In an embodiment, VPS 515 provides a locator service within VW 120, similar to real world GPS services.

VPS 515 enables a publishing function and a subscription function. The publishing function permits avatar 122d to send a message to other avatars 122 at a particular location in grid 525. For example, avatar 122d may run a business in VW 120. When another avatar, such as avatar 122a, comes into the proximity of avatar's 122d business, VPS 515 sends a message to avatar 122a advertising the business. Additionally, SSN 430 examines user's 112a user profile to determine user's 112a preferences and to publish a message to avatar 122a that is tailored to user's 112a preferences. Also, SSN 430 sends a text message or e-mail to user 112a containing the message. The subscription function permits avatar 122d to check for pending messages when avatar 122d enters new grid 525 locations.

Figure 6:
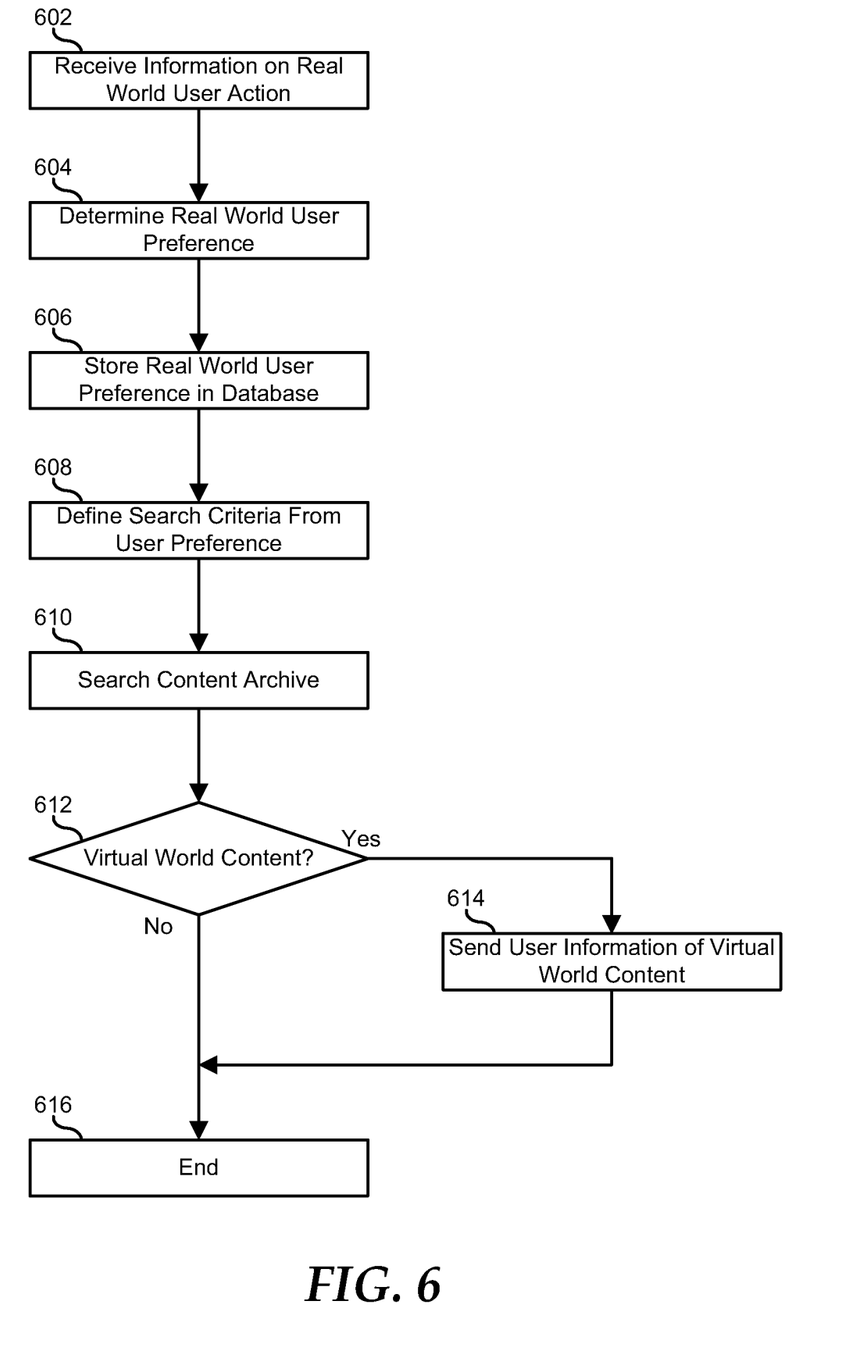
FIG. 6 is a flow chart showing a method of bridging between the real world and the virtual world.

FIG. 6 is a flow chart illustrating a method of bridging between the real world and a virtual world. Information is received about a real world activity or action of a real world user of a virtual world application in block 602. For example, users 112 can provide an input to M×M 300 via one or more protocol gateway 311 through 315 to a blog posting 142, or to a social networking site 144. In another example, network-connected devices 116 in combination with sensor network 145 or locator service 146 can indicate a position within a sensor network on a GPS grid. A real world user preference is determined in response to receiving the information in block 604. For example, an application infolet 335 may read information on user's 112a social networking site 144 and determine that user 112a has a preference for modern art. The real world preference is stored in a database in block 606. Here, user's 112a preference for modern art can be stored in profile database 348. The database is accessed and a search criteria determined based upon the real world preference in block 608. In an embodiment, a search criteria can be determined that focuses on the term "modern art," or the term "modern art" can be the search criteria for an image database that provides various modern art images as a search result. The search criteria are sent to a content archive containing content items from the virtual world application in block 610. For example, content search infolet 332 can be supplied with the term "modern art," or with images of modern art, and content search infolet 332 can search content archive 141 for content in VW 120 that matches the search criteria. A decision is made as to whether or not the search found matching content in the virtual world application in decision node 612. If not, the "NO" branch of decision node 612 is taken and processing ends in block 616. If the search found matching content in the virtual world application, then the "YES" branch of decision node 612 is taken, and information is sent to the user indicating that the virtual world application contains matching content in block 614, and processing ends in block 616. For example, if content search infolet 332 found a gallery of modern art in VW 120, then the location of the gallery can be sent to user 112a through e-mail protocol gateway 312, MMS protocol gateway 313, or another gateway, informing user 112a of the presence of the gallery in VW 120.

Figure 7:
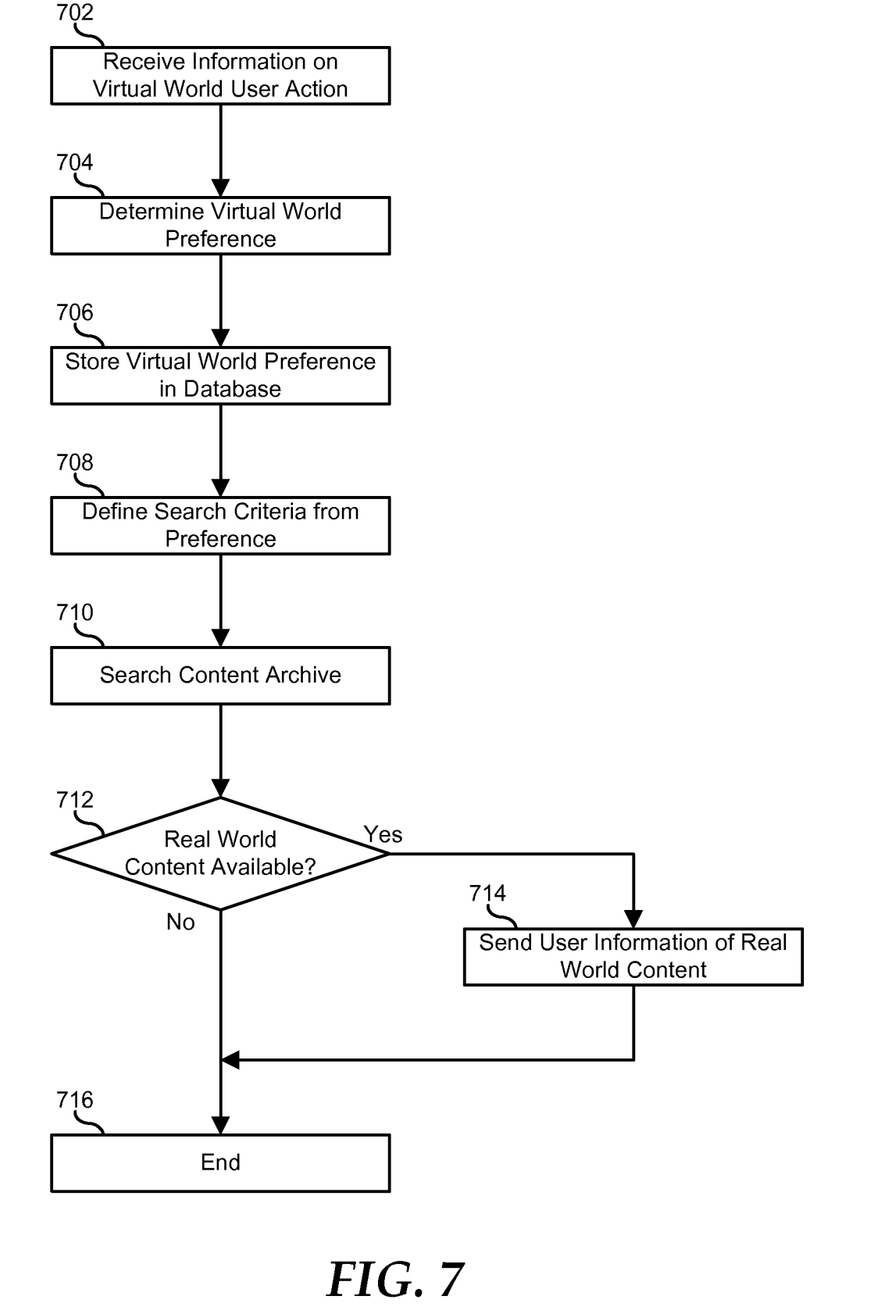
FIG. 7 is a flow chart showing a method of bridging between the virtual world and the real world.

FIG. 7 is a flow chart illustrating a method of bridging between a virtual world and the real world. Information is received about a virtual world activity or action of an avatar in a virtual world application in block 702. For example, avatar 122b can attend a virtual conference event in VW 120. A virtual world preference is determined in response to receiving the information in block 704. For example, the virtual conference event attended by avatar 122b may relate to World Wide Web content development, and thus a virtual world preference for web development can be determined. The virtual world preference is stored in a database in block 706. Here, avatar's 122b preference for web development can be stored in profile database 348. The database is accessed and a search criteria determined based upon the virtual preference in block 708. In an embodiment, a search criteria can be determined that focuses on web development. The search criteria are sent to a content archive containing content items from the real world application in block 710. For example, content search infolet 332 can be supplied with the term "modern art," or with images of modern art, and content search infolet 332 can search content archive 141 for content in AS&C 140 that matches the search criteria. A decision is made as to whether or not the search found matching content in the real world in decision node 712. If not, the "NO" branch of decision node 712 is taken and processing ends in block 716. If the search found matching content in the real world, then the "YES" branch of decision node 712 is taken, and information is sent to the user indicating that the real world contains matching content in block 714, and processing ends in block 716. For example, if content search infolet 332 found a local group of web developers that meet regularly in user's 112b local area, then the location and time of the meeting can be sent to user 112b through e-mail protocol gateway 312, MMS protocol gateway 313, or another gateway. Notifications can also be sent or published using infolets to social networking sites such as Facebook, Twitter, etc.

Figure 8:
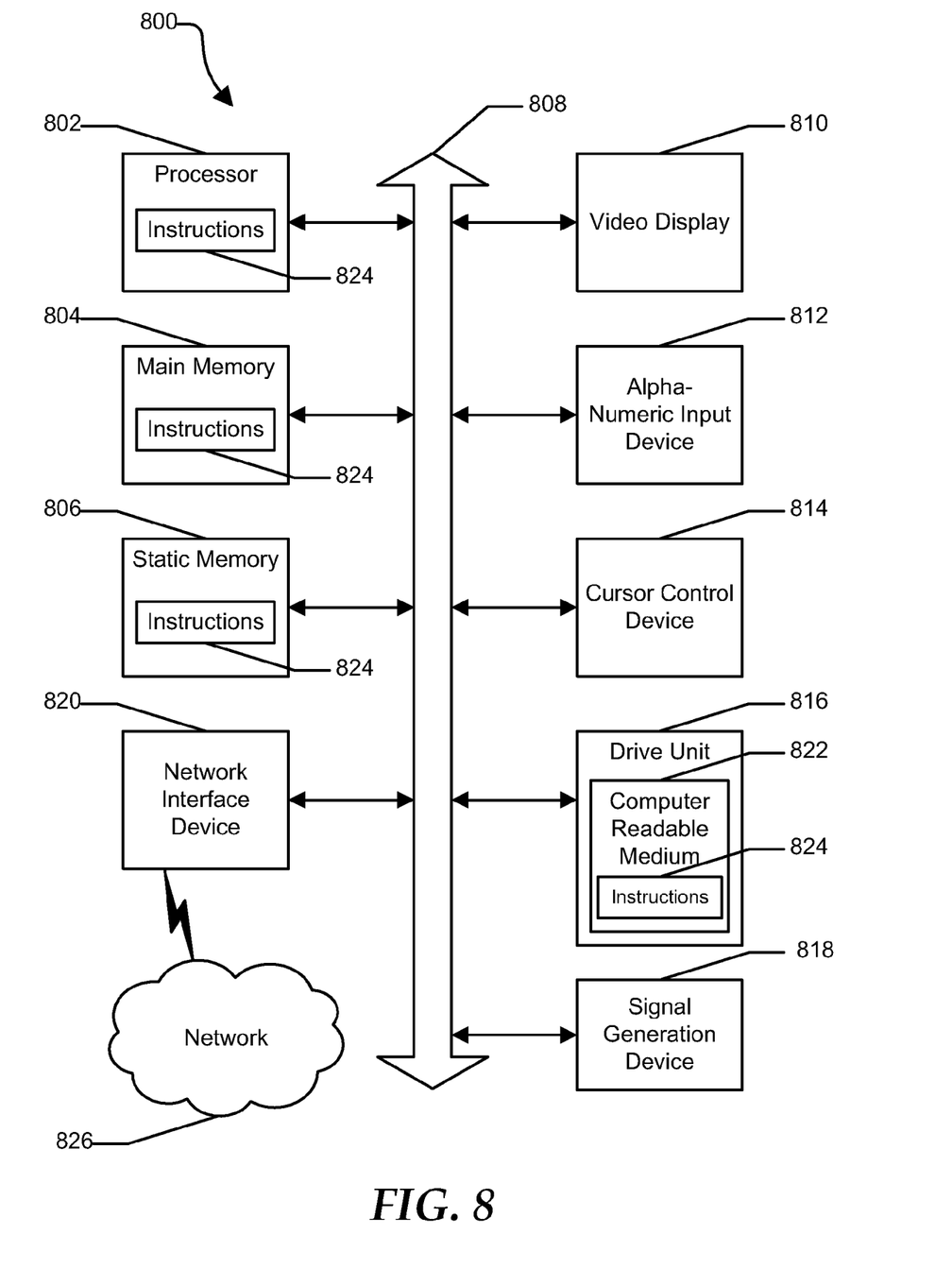
FIG. 8 shows an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box, a personal digital assistant, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid-state display, or a cathode ray tube (CRT). Additionally, the computer system 800 may include an input device 812 such as a keyboard, and a cursor control device 814 such as a mouse. Alternatively, input device 812 and cursor control device 814 can be combined in a touchpad or touch sensitive screen. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A communication bridging system comprising:
   a gateway server that couples the communication bridging system to a user device; and
   a bridge interface server including:
      a first infolet coupled to the gateway server, wherein the first infolet couples the communication bridging system to a first virtual world application; and
      a second infolet coupled to the gateway server and to the first infolet, wherein the second infolet couples the communication bridging system to a first real world application;
   wherein the communication bridging system performs operations comprising:
      receiving from the first infolet first information related to a first activity of a first avatar within the virtual world application, wherein the first avatar is associated with the user device;
      locating the user device;
      obtaining second information from the second infolet based on the first activity and the location of the user device; and
      sending the second information to the user device through the gateway server.

2. The communication bridging system of claim 1 wherein the second infolet includes a content archive for providing the user device with search results on archived content, wherein the content archive includes content from the virtual world application.

3. The communication bridging system of claim 2 wherein the operations of the communication bridging system further comprise:
   obtaining third information requested by the user device from the content archive; and
   sending the third information to the user device.

4. The communication bridging system of claim 3 wherein:
   the virtual world application locates the first avatar and a second avatar in the virtual world application; and
   wherein the operations of the communication bridging system further comprise:
      requesting third information from the second infolet based upon the location of the second avatar in the virtual world;
      sending the third information to the user device; and
      sending fourth information to the user device, wherein the third information comprises the location of the second avatar.

5. The communication bridging system of claim 1 wherein the operations of the communication bridging system further comprise:
   requesting third information from the second infolet based upon the location of the user device, wherein the third information comprises content from the virtual world application; and
   sending the third information to the first avatar through the first infolet.

6. The communication bridging system of claim 5 wherein the operations of the communication bridging system further comprise:
   requesting fourth information from the first infolet, wherein the fourth information comprises information regarding trade conducted by the user device in the virtual world application, and wherein further the trade in the virtual world application is conducted in a virtual currency that is exchangeable for real currency; and billing an account associated with the user device, wherein the billing is conducted in the real currency, and the amount of the billing is based upon the amount of trade in the virtual world application conducted by the user device.

7. The communication bridging system of claim 1 wherein the gateway server couples the communication bridging system to the user device through a plurality of data protocols.

8. The communication bridging system of claim 1 further comprising:
a third infolet coupled to the gateway server, wherein the third infolet couples the communication bridging system to a second virtual world application; and
wherein the operations of the communication bridging system further comprise:
obtaining third information requested by the user device from the third infolet; and
sending the third information to the second virtual world application through the third infolet.

9. The communication bridging system of claim 8 further comprising:
a fourth infolet coupled to the gateway server, to the first infolet, the second infolet, and the third infolet, wherein the fourth infolet couples the communication bridging system to a second real world application; and
wherein the operations of the communication bridging system further comprise:
obtaining fourth information requested by the user device from the fourth infolet; and
sending the fourth information:
to the first virtual world application through the first infolet; and
to the second virtual world application through the third infolet.

10. The communication bridging system of claim 1 wherein the second infolet comprises a content search infolet, a publisher infolet, an aggregator infolet, and a social networking site infolet.

11. The communication bridging system of claim 1 wherein locating the user device is based upon a global positioning system.

12. A method of bridging between a virtual world and a real world, comprising:
receiving first information related to an action of a first avatar in a virtual world application, the first avatar being associated with a user;
in response to receiving the first information, determining a virtual world preference for a user associated with the avatar, wherein the virtual world preference is determined by utilizing instructions from a memory that are executed by a processor;
determining a location of a user device, wherein the user device is associated with the user;
in response to determining the virtual world preference and the location of the user device, searching a content archive containing content items from the real world for a first particular content item that relates to the preference and to the location of the user device; and
sending second information to the user device indicating that the real world contains the particular content item.

13. The method of claim 12 wherein the first information comprises information regarding the location of the first avatar and a second avatar in the virtual world application.

14. The method of claim 12 further comprising:
receiving second information related to a second action of the avatar in the virtual world application;
in response to receiving the second information, determining a second virtual world preference for the user;
in response to determining the first and second preferences, searching the content archive for a second particular content item that relates to the first and second preferences; and
sending a third information to the user device indicating that the real world contains the particular content.

15. The method of claim 12 wherein the content archive comprises content from one of a content library, a blog library, a rich site summary feed, a social networking site, a location service, and a combination thereof.

16. The non-transitory computer readable medium of claim 15, wherein the first information comprises information regarding the location of the avatar in the virtual world application.

17. The non-transitory computer readable medium of claim 15, wherein the operations further comprise:
receiving second information related to a second action of the avatar in the virtual world application;
determining a second virtual world preference for the user in response to receiving the second information;
searching the content archive for a second particular content item that relates to the first and second preferences in response to determining the first and second preferences; and
sending a third information to the user device indicating that the real world contains the particular content.

18. The non-transitory computer readable medium of claim 15, wherein the content archive comprises content selected from a group comprising a content library, a blog library, a rich site summary feed, a social networking site, and a location service.

19. A non-transitory computer readable medium comprising a plurality of instructions, which when loaded and executed by a processor, cause the processor to perform operations comprising:
receiving first information related to an action of an avatar in a virtual world application, the first avatar being associated with a user;
determining a virtual world preference for a user associated with the avatar in response to receiving the first information;
determining a location of a user device, wherein the user device is associated with the user;
searching a content archive containing content items from the real world for a first particular content item that relates to the preference in response to determining the virtual world preference and the location of the user device; and
sending second information to the user device indicating that the real world contains the particular content item.

20. The method of claim 12 wherein determining the location of the user device is based upon a global positioning system.

* * * * *